United States Patent
Bent et al.

(10) Patent No.: US 9,858,185 B1
(45) Date of Patent: Jan. 2, 2018

(54) MULTI-TIER DATA STORAGE USING INCLUSIVE/EXCLUSIVE BURST BUFFER CACHING BASED ON REFERENCE COUNTS

(71) Applicant: EMC Corporation, Hopkinton, MA (US)

(72) Inventors: John M. Bent, Los Alamos, NM (US); Sorin Faibish, Newton, MA (US); James M. Pedone, Jr., West Boylston, MA (US)

(73) Assignee: EMC Corporation, Hopkinton, MA (US)

( * ) Notice: Subject to any disclaimer, the term of this patent is extended or adjusted under 35 U.S.C. 154(b) by 34 days.

(21) Appl. No.: 14/580,529

(22) Filed: Dec. 23, 2014

(51) Int. Cl.
  *G06F 12/00* (2006.01)
  *G06F 12/0811* (2016.01)
  *G06F 12/0813* (2016.01)

(52) U.S. Cl.
  CPC ...... *G06F 12/0811* (2013.01); *G06F 12/0813* (2013.01); *G06F 2212/283* (2013.01)

(58) Field of Classification Search
  CPC ............ G06F 12/0811; G06F 12/0813; G06F 2212/283
  See application file for complete search history.

(56) References Cited

U.S. PATENT DOCUMENTS

| | | | |
|---|---|---|---|
| 6,851,024 B1 | 2/2005 | Wilkes et al. | |
| 8,788,758 B1 * | 7/2014 | de la Iglesia | G06F 12/121 711/136 |
| 9,239,790 B1 * | 1/2016 | Banerjee | G06F 12/0808 |
| 9,639,457 B1 * | 5/2017 | Piszczek | G06F 12/02 |
| 2005/0268062 A1 * | 12/2005 | Nagase | G06F 3/061 711/167 |
| 2012/0066337 A1 * | 3/2012 | Wu | G06F 3/0605 709/214 |
| 2013/0227194 A1 | 8/2013 | Kannan et al. | |
| 2013/0346693 A1 * | 12/2013 | Zhang | G06F 12/0864 711/121 |

OTHER PUBLICATIONS

Theodore M. Wong et al., "My cache or yours? Making storage more exclusive", USENIX Annual Technical Conference, Monterey, CA pp. 161-175, (Jun. 2002).

* cited by examiner

*Primary Examiner* — Gurtej Bansal
(74) *Attorney, Agent, or Firm* — Ryan, Mason & Lewis, LLP

(57) ABSTRACT

Improved multi-tier data storage is provided using inclusive/exclusive burst buffer caching techniques based on reference counts. An exemplary multi-tier storage system comprises at least first and second storage tiers for storing data, wherein at least one of the first and second storage tiers comprises at least one cache, and wherein the data is retained in the at least one cache as a given cached data item based on a reference count indicating a number of expected requests for the given cached data item. The number of expected requests for the given cached data item in a given cache is based, for example, on a number of nodes serviced by the given cache. A burst buffer appliance is also provided for implementing the cache retention policies described herein.

22 Claims, 5 Drawing Sheets

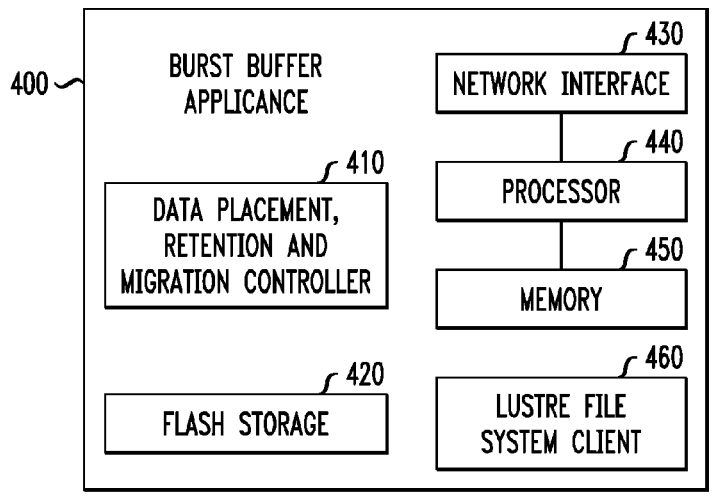

400 — BURST BUFFER APPLIANCE
- 410 DATA PLACEMENT, RETENTION AND MIGRATION CONTROLLER
- 420 FLASH STORAGE
- 430 NETWORK INTERFACE
- 440 PROCESSOR
- 450 MEMORY
- 460 LUSTRE FILE SYSTEM CLIENT

FIG. 5

```
// open function
// scheduler/resource manager will know how many participants will access file
abba_open_read(obj) {
  // when this call happens, first fetch data from labba
  participants = scheduler->query(obj);
  labba->open_read(obj,participants);
}

// when a read comes, if data is cached in performance tier, then return data
// otherwise, fetch data from labba and place in cache // shown for a restful interface of entire object get/put
// for a byte range implementation, replace object with byte range
abba_read(obj,buf) {
  if (! cache->contains(obj,off,len)) {
    labba->read(obj,buf)
    cache->write(obj,buf)
  } else {
    cache->read(obj,buf)
  }
  return;
}
```

FIG. 6

```
// data structure that labba uses for reference counting
struct {
  obj id;   // the id of the object
  int readers; // the pending readers
} reference_count;
// on labba, track participants
labba_open_read(obj,participants) {
  ref_count = ref_counts[obj];
  if (ref_count == NULL){
    ref_count = new reference_count();
    ref_count.id = obj;
    ref_count.readers = participants;
    ref_counts[obj] = ref_count;
  }
  // start asynchronous thread to fetch object into performance tier
  thread_pool->add(new Reader(obj));
}
// then on each read, decrement readers
labba_read(obj,buf) {
  // wait for asynchronous thread to finish if it hasn't yet
  while( ! fast_tier->contains(obj) ) {
    microsleep(1); // tune this accordingly to hardware latencies
  }
    // do the read
  fast_tier->read(obj,buf):
  // decrement the readers
  ref_count = ref_counts[obj];
  ref_count->readers--;
  if (ref_count->readers == 0) {
    fast_tier->evict(obj); // not needed anymore
    free(ref_count);
    ref_counts[obj] = NULL;
  }
  return;
}
```

US 9,858,185 B1

MULTI-TIER DATA STORAGE USING INCLUSIVE/EXCLUSIVE BURST BUFFER CACHING BASED ON REFERENCE COUNTS

FIELD

The invention relates generally to data storage, and more particularly to the caching of data in a multi-tier storage system.

BACKGROUND

A cache stores a collection of data in a fast memory for faster access by duplicating original values stored elsewhere. In a parallel computing environment, for example, disk storage arrays might use several gigabytes of random access memory (RAM) as a cache. Historically, an inclusive cache management policy was employed whereby the same data blocks were duplicated at both the client level and the array level of the cache hierarchy. J. Wilkes and T. Wong, "My Cache or Yours, Making Storage More Exclusive," USENIX Annual Technical Conference, 161-175 (USENIX 2002), recognized that when an inclusive cache management policy was employed, the aggregate cache was effectively only as large as the larger of the client cache and the array cache, rather than the sum of the two caches. Wilkes and Wong proposed an exclusive cache management policy whereby a given data block is cached in a client cache or a disk array cache, but not both at the same time.

Nonetheless, a need remains for improved multi-tiered caching techniques for parallel computing environments.

SUMMARY

Illustrative embodiments of the present invention provide improved multi-tier data storage using inclusive/exclusive burst buffer caching techniques based on reference counts. In one exemplary embodiment, a multi-tier storage system comprises at least first and second storage tiers for storing data, wherein at least one of the first and second storage tiers comprises at least one cache, and wherein the data is retained in the at least one cache as a given cached data item based on a reference count indicating a number of expected requests for the given cached data item. The number of expected requests for the given cached data item in a given cache is based, for example, on a number of nodes serviced by the given cache.

In another exemplary embodiment, a request for the given cached data item comprises an indication of the reference count. The reference count is optionally adjusted each time the given cached data item is requested. The given cached data item can be retained in the at least one cache until the reference count is a predefined value.

In a further exemplary embodiment, a burst buffer appliance is provided for use in a multi-tier storage system. The exemplary burst buffer appliance comprises a memory and at least one processing device configured to (i) obtain data in the multi-tier storage system, wherein the multi-tier storage system comprises at least a first storage tier and a second storage tier for storing data, wherein at least one of the first and second storage tiers comprises at least one cache; and (ii) store the data in the at least one cache as a given cached data item, wherein the given cached data item is retained in the at least one cache based on a reference count indicating a number of expected requests for the given cached data item.

As noted above, illustrative embodiments described herein provide significant improvements relative to conventional storage arrangements. In some of these embodiments, use of a cache retention policy based on reference counts avoids the wasteful redundancy that often occurs in multiple levels of caches.

BRIEF DESCRIPTION OF THE DRAWINGS

FIG. 4 is a block diagram of an exemplary burst buffer appliance node of FIG. 1 or 2; and FIGS. 5 and 6, collectively, illustrate exemplary pseudo code for multi-tiered caching operations incorporating aspects of the present invention.

DETAILED DESCRIPTION

Illustrative embodiments of the present invention will be described herein with reference to the storage of data generated by an exemplary parallel computing system and associated clients, servers, storage arrays and other processing and storage devices. It is to be appreciated, however, that the invention is not restricted to use with the particular illustrative parallel computing system and device configurations shown. Accordingly, the terms "parallel computing system" and "parallel file system," as used herein, are intended to be broadly construed so as to encompass, for example, distributed computing systems and other types of computing systems and related storage implemented using one or more processing and storage devices.

In one exemplary embodiment, a two-tier storage system comprises a first performance tier that employs memory based on performance considerations (e.g., access times) and a second capacity tier that employs storage based on capacity considerations. In this manner, the two-tier storage system balances between the relative costs of memory and other storage and their relative speeds. It is to be appreciated that more than two storage tiers may be used in other embodiments. While one or more embodiment of the present invention are illustrated herein using multiple storage tiers comprised of a plurality of exemplary storage technologies, such as flash storage, other storage technologies can be employed in each tier, as would be apparent to a person of ordinary skill in the art.

According to one aspect of the invention, data is cached in a multi-tier storage using an inclusive/exclusive retention policy based on reference counts. As used herein, a "reference count" indicates a number of expected requests for a particular cached data item. As discussed herein, the number of expected accesses can be obtained deterministically based on the mapping of nodes among the various tiers of the multi-tiered storage system, or can be estimated based on historical access information. For example, if a given cache in the capacity tier services a particular number of nodes in the performance tier, then the reference count for items in the given cache is set to the particular number. In one exemplary embodiment, data requests for a data item are augmented with the expected number of accesses, which is used to initialize the reference count for the data item. Each time the data item is requested, the reference count is decremented. Each data item is retained in the respective cache until the reference count reaches zero. In this manner, the disclosed retention policy is inclusive until the reference count reaches zero, and is exclusive thereafter.

Figure 1:
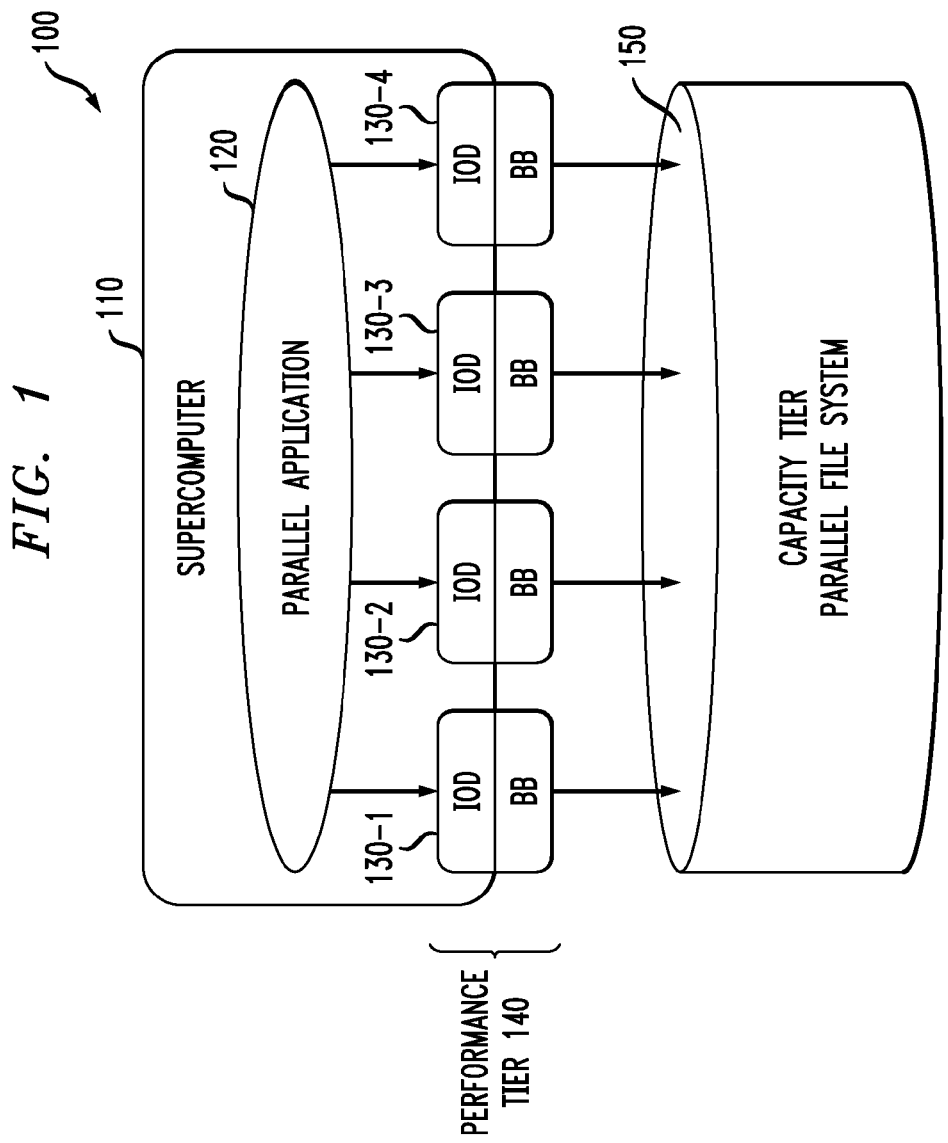
FIG. 1 illustrates an exemplary multi-tiered parallel computing system configured in accordance with an illustrative embodiment of the present invention.

FIG. 1 illustrates an exemplary multi-tiered parallel computing system 100 configured in accordance with an illustrative embodiment of the present invention. As shown in FIG. 1, the exemplary multi-tiered parallel computing system 100 comprises a parallel application 120 executing on a supercomputer 110, typically comprised of a plurality of compute nodes (not shown in FIG. 1). The parallel application 120 generates a workload that is processed by a plurality of burst buffer (BB) appliances 130-1 through 130-4 that each execute input-output dispatcher (IOD) software. The storage workload or portions thereof can be stored by one or more burst buffer appliances 130 in a performance tier 140 comprised of flash memory associated with the corresponding burst buffer appliance and/or in a capacity tier 150, in accordance with aspects of the invention. As discussed further below in conjunction with FIG. 2, the exemplary capacity tier 150 is implemented as an exemplary Lustre file system.

Typically, the number of compute nodes is greater than the number of nodes in the performance tier 140, which is greater than the number of nodes in the capacity tier 150. The number of processes executing on the compute nodes that can access data in a given cache of the performance tier 140 is typically known a priori and is used to establish the reference count for cached items in the given cache of the performance tier 140. Likewise, the number of nodes in the performance tier 140 that can access data in a given cache of the capacity tier 150 is used to establish the reference count for cached items in the given cache of the capacity tier 150. For example, a particular node in the performance tier 140 will know the number of sibling nodes that share the same data item due to the striping scheme. Thus, the total number of sibling nodes is used to set the reference count. As discussed further below in conjunction with FIG. 5, the reference count is included in the read operation issued by any of the sibling nodes.

Figure 2:
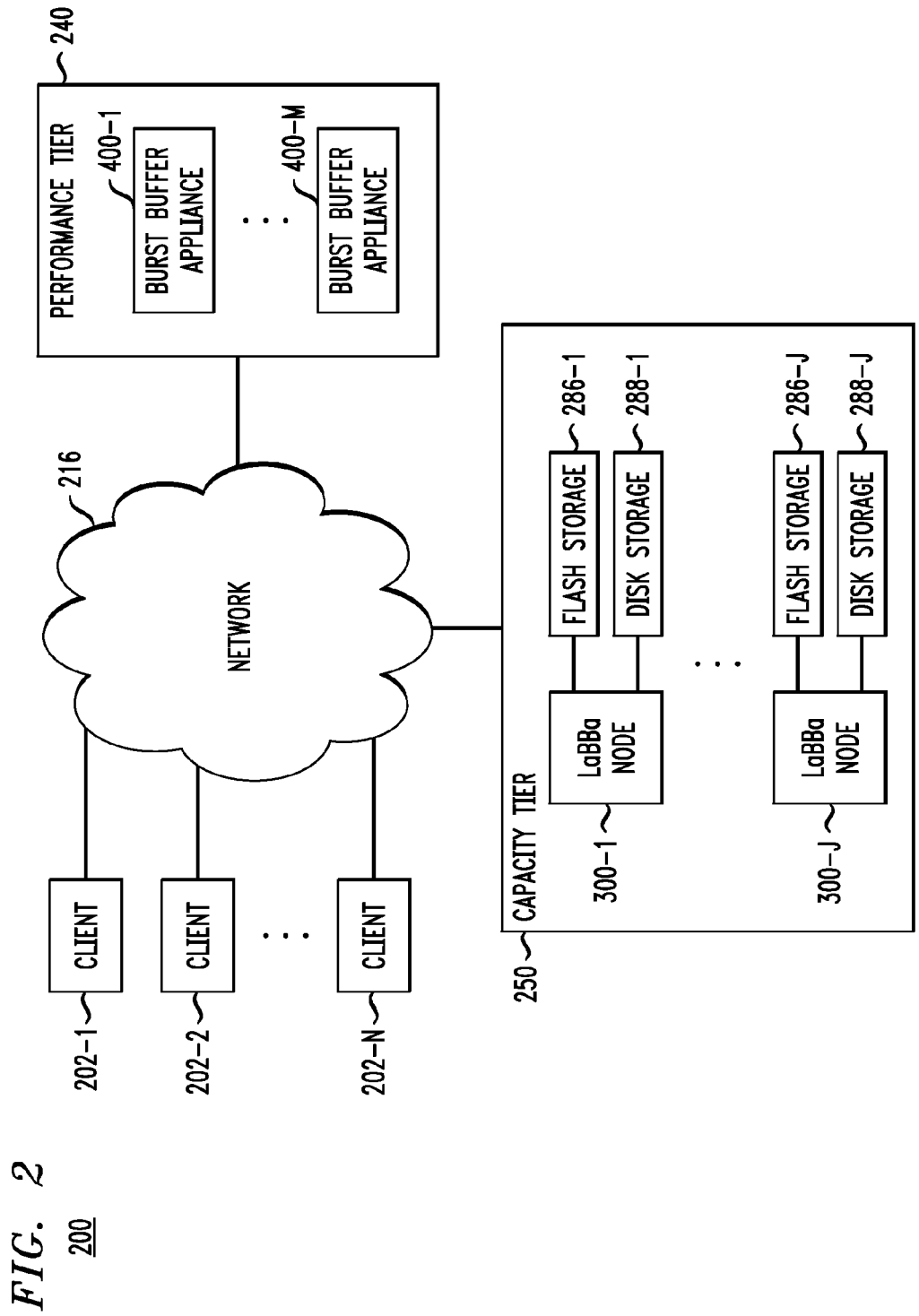
FIG. 2 illustrates an exemplary embodiment of the parallel computing system of FIG. 1.

FIG. 2 illustrates an exemplary implementation 200 of the multi-tiered parallel computing system 100 of FIG. 1. As shown in FIG. 2, the exemplary multi-tier storage system 200 comprises a plurality of clients 202-1 through 202-N and a plurality of storage tiers, such as a performance tier 240 and a capacity tier 250, connected by a network 216. The clients 202 may also be referred to herein as simply a "user." The term "user" should be understood to encompass, by way of example and without limitation, a user device, a person utilizing or otherwise associated with the device, a software client executing on a user device or a combination thereof. An operation described herein as being performed by a user may therefore, for example, be performed by a user device, a person utilizing or otherwise associated with the device, a software client or by a combination thereof.

The exemplary performance tier 240 comprises a plurality of burst buffer appliances 400-1 through 400-M, discussed further below in conjunction with FIG. 4. One or more burst buffer appliances 400-1 through 400-M are optionally configured to control movement of data between the storage devices of the performance and capacity tiers 240 and 250, respectively, and to control the retention of data in one or more caches of the performance tier 240 and/or capacity tier 250 based on reference counts. Examples of such movement will be described below.

The exemplary capacity tier 250 comprises a plurality of LaBBa (burst buffer (BB) in Lustre) nodes 300-1 through 300-J, discussed further below in conjunction with FIG. 3. As shown in FIG. 2, each exemplary LaBBa node 300-$i$ has associated flash storage 286-$i$ and disk storage 288-$i$. The flash storage 286-$i$ in each LaBBa node 300-$i$ comprises a secondary performance tier.

The exemplary performance tier 240 is implemented using the flash storage of the buffer appliances 400, such as a DSSD™ flash storage system, commercially available from EMC Corp. or other high-speed memory having a substantially lower access time than the capacity tier 250. Although flash memory will often be used for the high-speed memory of the burst buffer appliance, other types of low-latency memory could be used instead of flash memory. Typically, such low-latency memories comprise electronic memories, which may be implemented using non-volatile memories, volatile memories or combinations of non-volatile and volatile memories. Accordingly, the term "burst buffer appliance," as used herein, is intended to be broadly construed so as to encompass any network appliance or other arrangement of hardware and associated software or firmware that collectively provides a high-speed memory and optionally an analytics engine to control access to the high-speed memory. Thus, such an appliance includes a high-speed memory that may be viewed as serving as a buffer between a computer system comprising clients executing on compute nodes and a file system such as the capacity storage tier 250, for storing data associated with different types of IO operations.

The exemplary capacity tier 250 is implemented using, by way of example, a Lustre file system, although use of Lustre is not a requirement of the present invention. Lustre is a Linux-based high performance cluster file system utilized for computer clusters ranging in size from small workgroup clusters to large-scale, multi-site clusters. Additional details regarding conventional aspects of Lustre file systems may be found in, for example, Cluster File Systems, Inc., "Lustre: A Scalable, High-Performance File System," November 2002, pp. 1-13, and F. Wang et al., "Understanding Lustre Filesystem Internals," Tech Report ORNL/TM-2009/117, April 2010, pp. 1-95, which are incorporated by reference herein.

The different storage tiers 240 and 250 in this embodiment comprise different types of storage devices having different performance characteristics and the two exemplary storage technologies may be varied in other embodiments. The exemplary flash storage devices of the exemplary performance tier 240 are generally significantly faster in terms of read and write access times and generally otherwise perform better than the storage devices of the capacity tier 250, which typically provide greater overall capacity than the exemplary performance tier 240. Thus, the flash storage devices of the performance tier 240 generally provide higher performance than the storage devices of the capacity tier 250, but the storage devices of the capacity tier 250 generally provide higher capacity at lower cost than the flash storage devices. These storage tiers comprise respective disjoint subsets of storage. However, numerous alternative tiering arrangements may be used, including three or more tiers each providing a different level of performance. The particular storage devices used in a given storage tier may be varied in other embodiments and multiple distinct storage device types may be used within a single storage tier.

The exemplary tiering arrangement of FIG. 2 therefore makes it possible to dynamically balance the conflicting requirements of storage capacity and IO throughput, thereby avoiding situations in which either performance is less than optimal or the costs of implementing the system become excessive. Arrangements of this type can provide further acceleration of IO operations in the parallel computing system of FIGS. 1 and 2, leading to enhanced system performance relative to conventional arrangements, while additionally or alternatively providing an ability to achieve particular levels of performance at lower cost.

The network 216 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks. The term "network," as used herein, is therefore intended to be broadly construed so as to encompass a wide variety of different network arrangements, including combinations of multiple networks possibly of different types.

It should be noted with regard to the illustrative embodiments of FIGS. 1 and 2 that modifications may be made to one or more applications, processes or other system elements or components in order to achieve additional improvements. For example, a job scheduler or other similar component within the system 100 or 200 can also be modified so as to take full advantage of the improved storage tiering functionality.

It is noted that one or more components of the multi-tiered parallel computing system 200 of FIG. 2 can be implemented on the cloud, as would be apparent to a person of ordinary skill in the art. For example, the clients 202 can execute on local compute nodes, while the performance tier 240 and capacity tier 250 are provided by services on the cloud, or the performance tier 240 and capacity tier 250 can be local, while the compute capacity for the clients 202 is provided by services on the cloud.

Figure 3:
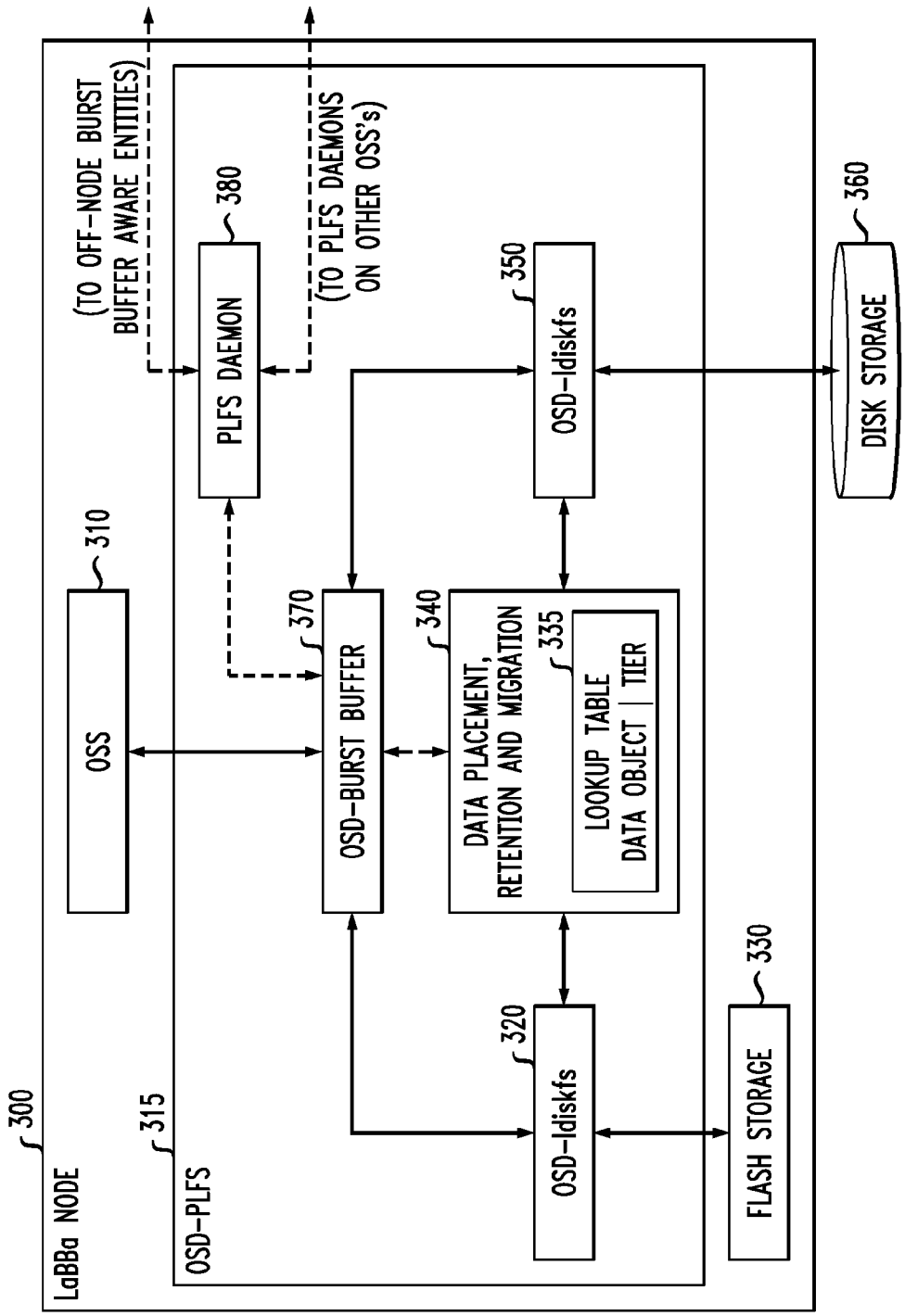
FIG. 3 is a block diagram of an exemplary LaBBa node of FIG. 2.

FIG. 3 is a block diagram of an exemplary LaBBa node 300 of FIG. 2. As shown in FIG. 3, a Lustre Object Storage Server (OSS) 310 communicates with an exemplary object storage device (OSD) based on the parallel log structured file system (PLFS) described in, for example, John Bent et al., "PLFS: A Checkpoint Filesystem for Parallel Applications," Int'l Conf. for High Performance Computing, Networking, Storage and Analysis 2009 (SC09) (November 2009), incorporated by reference herein.

The exemplary OSD-PLFS 315 comprises a burst buffer object storage device (OSD) 370 that optionally implements storage tiering control functionality. The OSD-burst buffer 370 communicates with a data placement, retention and migration controller 340 and a PLFS daemon 380. The data placement, retention and migration controller 340 may be at least partially implemented as part of the OSD-burst buffer 370 as a controller. As indicated above, the data placement, retention and migration controller 340 moves data in response to certain system calls, such as plfs_file_purge and plfs_file_prestage operations, and retains data in the caches based on a retention policy that employs reference counts in accordance with aspects of the invention.

In one exemplary implementation, the OSD-PLFS 315 of FIG. 3 will maintain a lookup table 335 in the data placement, retention and migration controller 340 for every data object that it stores, indicating whether the corresponding object is stored in a performance tier or a capacity tier in the exemplary embodiment. As noted above, additional or alternative storage tiers are also within the scope of the present invention.

The exemplary PLFS daemon 380 runs on each LaBBa node 300 and communicates with the OSD. For example, a client 202 on a compute node may request data from an OSS. The OSS notifies the PLFS daemon 380 on the LaBBa node 300 of the data request. The PLFS daemon 380 on the originating LaBBa node 300 knows that the exemplary requested data is part of a logical file that is striped across a plurality of LaBBa nodes 300. The originating PLFS daemon 380 can then notify PLFS daemons 380 on other LaBBa nodes 300 storing portions of the requested logical file of the request and indicate that the other LaBBa node s 300 should pre-fetch their data portions. The exemplary PLFS daemon 380 can also optionally communicate with off-node burst buffer-aware entities.

As shown in FIG. 3, the LaBBa node 300 further comprises an OSD-ldiskfs (local disk file system) 320, for a flash storage system 330 and an OSD-ldiskfs 350 for a disk storage system 360, in a known manner. For additional details regarding the LaBBa node 300, see, for example, U.S. patent application Ser. No. 13/928,985, filed Jun. 27, 2013, entitled "Cluster File System With a Burst Buffer Appliance for Controlling Movement of Data Among Storage Tiers," incorporated by reference herein.

FIG. 4 is a block diagram of an exemplary burst buffer appliance 400 of FIG. 1 or 2. As shown in FIG. 4, the burst buffer appliance 400 comprises a data placement, retention and migration controller 410, as well as flash storage 420. The exemplary data placement, retention and migration controller 410 retains data in the caches based on a retention policy that employs reference counts in accordance with aspects of the invention, in a similar manner to the data placement, retention and migration controller 340 of FIG. 3. The data placement and migration controller 410 is optionally configured to implement storage tiering control functionality for the multi-tier storage systems described herein. The burst buffer appliance 400 is thereby configured to control movement of data between the storage devices of the performance tier 240 and capacity tier 250. The data placement and migration controller 410 may be viewed as one possible example of what is more generally referred to herein as a "controller," and numerous alternative controllers having various configurations may be used in a given metadata server in other embodiments.

The burst buffer appliance 400 further comprises a processor 440 coupled to a memory 450. The processor 440 may comprise a microprocessor, a microcontroller, an application-specific integrated circuit (ASIC), a field-programmable gate array (FPGA) or other type of processing circuitry, as well as portions or combinations of such circuitry elements. The memory 450 may comprise random access memory (RAM), read-only memory (ROM) or other types of memory, in any combination. The memory 450 and other memories disclosed herein may be viewed as examples of what are more generally referred to as "computer program products" storing executable computer program code.

Also included in the burst buffer appliance 400 is network interface circuitry 430. The network interface circuitry 430 allows the burst buffer appliance 400 to communicate over the network 216 with the clients 202, object storage servers (LaBBa nodes 300) and metadata servers (not shown). The network interface circuitry 430 may comprise, for example, one or more conventional transceivers.

The data placement and migration controller 410 of the burst buffer appliance 400 may be implemented at least in part in the form of software that is stored in memory 450 and executed by processor 440. The burst buffer appliance 400 comprising processor, memory and network interface components as described above is an example of what is more generally referred to herein as a "processing device." Each of the clients 202 and LaBBa nodes 300 may similarly be implemented as a processing device comprising processor, memory and network interface components.

Each exemplary burst buffer appliance 400 in the present embodiment comprises a flash memory 420 or other high-speed memory having a substantially lower access time than the capacity tier 250. The burst buffer appliances 400 may optionally comprise an analytics engine, and may include other components. Thus, each exemplary burst buffer appliance 400 comprises a portion of the storage (for example, flash memory) for the performance tier 240.

In addition, each exemplary burst buffer appliance 400 further comprises a parallel log structured file system, based on, for example, the teachings of John Bent et al., "PLFS: A Checkpoint Filesystem for Parallel Applications," Int'l Conf. for High Performance Computing, Networking, Storage and Analysis 2009 (SC09) (November 2009), incorporated by reference herein.

Each exemplary burst buffer appliance 400 in the present embodiment also comprises a Lustre file system client 460 for communicating with the LaBBa nodes 300 in the capacity tier 250.

One challenge comes from "false sharing," in which requests for distinct data regions result in a smaller number of requests to large storage blocks. Although the requested regions are logically distinct, at a physical storage layer the requested regions share a storage block. For example, a data stripe in a file system server may be fetched as a full unit, especially as data servers in parallel file systems are increasingly object-based and future storage systems may move to a simpler representational state transfer (REST)-like interface in which objects are accessed in their entirety. For illustrative purposes, assume that a stripe block is 1 GB (Gigabyte) and eight separate processes each ask for a distinct 128 MB (Megabyte) region from this stripe. A naïve caching algorithm would keep this 1 GB region in the cache until the least recently used (LRU) victimization selected it, which may keep the data longer than is useful (to the detriment of earlier victimized data which may have a longer useful lifetime). An exemplary implementation evicts the data immediately after the eighth and final access.

For instances in which distinct requested regions do not exhibit false sharing, the reference counting will keep data longer than is necessary. For example, in the same scenario in which eight processes request distinct but sequential 128 MB regions in which the storage block is less than or equal to 128 MB, although the full file will be accessed eight times, each 128 MB region will only be accessed once. Thus, additional gains will be obtained in storage systems that can export important information about their striping parameters.

Caching Operations in the Two-Tier Storage System

FIG. 5 illustrates exemplary pseudo code 500 for an open function in accordance with the present invention. As shown in FIG. 5, a scheduler or resource manager will know how many participants are expected to access a file. For example, as noted above, a particular burst buffer appliance 400 in the performance tier 240 will know the number of sibling burst buffer appliances 400 that share the same data object due to the striping scheme. Thus, the total number of sibling nodes is used to set the reference count. As shown in FIG. 5, when a particular node, such as a particular burst buffer appliance 400, reads a given data object, the reference count is included in the read call issued by any of the sibling nodes in the form of the participants parameter. In this manner, the requests are augmented with the expected number of participants. It is noted that "abba" in the exemplary pseudo code 500 refers to a burst buffer appliance 400 and "labba" refers to a LaBBa node 300.

The exemplary pseudo code 500 will initially fetch the requested data from one or more LaBBa nodes 300 in response to an open_read call. When a read call is received, the data is returned if the data is cached in the performance tier 240. Otherwise, the data is fetched from one or more LaBBa nodes 300 and placed in a cache in the performance tier 240.

It is noted that the exemplary pseudo code 500 is shown for a RESTful interface that performs accesses for entire objects. For a byte range implementation, the exemplary pseudo code 500 replaces objects with the desired byte range.

The abba_read function will read the data if the data is not already in the cache and then write the data in the cache, or else the abba_read function will read the data object from the cache if the data is already there.

FIG. 6 illustrates exemplary pseudo code 600 to process the reference counts in accordance with the present invention. As shown in FIG. 6, the exemplary pseudo code 600 initially establishes the data structure used for reference counting the object and initializes the reference count based on the participants parameter. An asynchronous thread is started to fetch the object from the capacity tier 250 into the performance tier 240. On each read operation, the reference count is decremented. Once the asynchronous thread has completed, the read operation can be performed from the performance tier 240. Once the reference count reaches zero, the data object can be evicted from the cache of the capacity tier 250.

In the event of a conflict in the reference counts indicated by the sibling nodes, an exemplary embodiment will use the most recently received reference count.

CONCLUSION

It is to be appreciated that the particular operations and associated messaging illustrated in FIGS. 5 and 6 are exemplary only, and numerous other types of operations and messaging may be used in other embodiments.

It should therefore be understood that in other embodiments different arrangements of additional or alternative elements may be used. At least a subset of these elements may be collectively implemented on a common processing platform or each such element may be implemented on a separate processing platform.

Also, numerous other arrangements of computers, servers, storage devices or other components are possible in the parallel computing system 100, 200. Such components can communicate with other elements of the parallel computing system 100, 200 over any type of network or other communication media.

As indicated previously, components of a multi-tier storage system as disclosed herein can be implemented at least in part in the form of one or more software programs stored in memory and executed by a processor of a processing device. A memory having such program code embodied therein is an example of what is more generally referred to herein as a "computer program product."

The computing systems 100 and 200 or portions thereof may be implemented using one or more processing platforms each comprising a plurality of processing devices. Each such processing device may comprise a processor, a memory and network interface components of the type described for burst buffer appliances 400 in FIG. 4.

As indicated above, two-tier caching functionality such as that described in conjunction with FIGS. 5 and 6 can be implemented at least in part in the form of one or more software programs stored in memory and executed by a processor of a processing device such as a computer or server. A memory or other storage device having such program code embodied therein is an example of what is more generally referred to herein as a "computer program product." Certain system components are implemented using a combination of software and hardware.

It should again be emphasized that the above-described embodiments of the invention are presented for purposes of illustration only. Many variations and other alternative embodiments may be used. For example, the disclosed techniques are applicable to a wide variety of other types and arrangements of parallel computing systems and associated clients, servers and other processing and storage devices that can benefit from the multi-tier functionality as described herein. Also, the particular configurations of system and device elements shown in FIGS. 1 and 2 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A multi-tier storage system, comprising:
   at least first and second storage tiers, wherein at least one of said first and second storage tiers comprises at least one cache, and wherein data is retained in said at least one cache as a given cached data item until a reference count indicating a number of expected access requests for said given cached data item is a predefined value, wherein said reference count is deterministically established, upon an open call of at least a portion of one file comprising said given cached data item, based on one or more of an expected number of processes that will access said given cached data item and an expected number of nodes that will access said given cached data item, such that each of said expected processes have accessed said given cached data item before said given cached data item is evicted from said at least one cache.

2. The multi-tier storage system of claim 1, wherein the number of expected read requests for said given cached data item in a given cache is obtained deterministically based on a number of nodes serviced by the given cache.

3. The multi-tier storage system of claim 1, wherein a request for said given cached data item comprises an indication of said reference count.

4. The multi-tier storage system of claim 1, wherein said reference count is adjusted each time said given cached data item is requested.

5. The multi-tier storage system of claim 1, wherein one or more components of said plurality of compute nodes and said first and second storage tiers are provided by one or more services on a cloud.

6. The multi-tier storage system of claim 1, wherein said given cached data item is retained in said at least one cache until said reference count is zero.

7. The multi-tier storage system of claim 1, wherein one or more of the expected number of processes and the expected number of nodes is determined based on a striping scheme.

8. The multi-tier storage system of claim 1, wherein a given node knows a number of sibling nodes that share the given cached data item and wherein the number of sibling nodes is used to set the reference count.

9. A burst buffer appliance for use in a multi-tier storage system, said burst buffer appliance comprising:
   a memory; and
   at least one processing device configured to:
   obtain data in said multi-tier storage system, wherein said multi-tier storage system comprises at least a first storage tier and a second storage tier for storing data, wherein at least one of said first and second storage tiers comprises at least one cache; and
   store said data in said at least one cache as a given cached data item, wherein said given cached data item is retained in said at least one cache until a reference count indicating a number of expected access requests for said given cached data item is a predefined value, wherein said reference count is deterministically established, upon an open call of at least a portion of one file comprising said given cached data item, based on one or more of an expected number of processes that will access said given cached data item and an expected number of nodes that will access said given cached data item, such that each of said expected processes have accessed said given cached data item before said given cached data item is evicted from said at least one cache.

10. The burst buffer appliance of claim 9, wherein the number of expected read requests for said given cached data item in a given cache is obtained deterministically based on a number of nodes serviced by the given cache.

11. The burst buffer appliance of claim 9, wherein a request for said given cached data item comprises an indication of said reference count.

12. The burst buffer appliance of claim 9, wherein said reference count is adjusted each time said given cached data item is requested.

13. The burst buffer appliance of claim 9, wherein said data is obtained from a plurality of compute nodes and wherein one or more components of said plurality of compute nodes and said first and second storage tiers are provided by one or more services on a cloud.

14. The burst buffer appliance of claim 9, wherein one or more of the expected number of processes and the expected number of nodes is determined based on a striping scheme.

15. The burst buffer appliance of claim 9, wherein a given node knows a number of sibling nodes that share the given cached data item and wherein the number of sibling nodes is used to set the reference count.

16. A method for retaining data in at least one cache of a multi-tier storage system, comprising the steps of:
   obtaining data in said multi-tier storage system, said multi-tier storage system comprising at least a first storage tier and a second storage tier for storing data, wherein at least one of said first and second storage tiers comprises said at least one cache; and
   storing said data in said at least one cache as a given cached data item, wherein said given cached data item is retained in said at least one cache until a reference count indicating a number of expected access requests for said given cached data item is a predefined value, wherein said reference count is deterministically established, upon an open call of at least a portion of one file comprising said given cached data item, based on one or more of an expected number of processes that will access said given cached data item and an expected number of nodes that will access said given cached data item, such that each of said expected processes have accessed said given cached data item before said given cached data item is evicted from said at least one cache.

17. The method of claim 16, wherein a request for said given cached data item comprises an indication of said reference count.

18. The method of claim 16, further comprising the step of adjusting said reference count each time said given cached data item is requested.

19. A tangible machine-readable recordable storage medium, wherein one or more software programs when executed by one or more processing devices implement the steps of the method of claim 16.

20. The method of claim 16, wherein the number of expected read requests for said given cached data item in a given cache is obtained deterministically based on a number of nodes serviced by the given cache.

21. The method of claim 16, wherein one or more components of said plurality of compute nodes and said first and second storage tiers are provided by one or more services on a cloud.

22. The method of claim 16, wherein one or more of the expected number of processes and the expected number of nodes is determined based on a striping scheme.

\* \* \* \* \*